United States Patent [19]

Monte

[11] Patent Number: 5,389,391

[45] Date of Patent: Feb. 14, 1995

[54] LOW PH ANTIMICROBIAL FOOD COMPOSITION

[76] Inventor: Woodrow C. Monte, 6411 S. River Dr., #65, Tempe, Ariz. 85283

[21] Appl. No.: 58,226

[22] Filed: May 10, 1993

[51] Int. Cl.⁶ .................................................. A23L 3/34
[52] U.S. Cl. .................................. 426/335; 426/532; 426/656; 426/658
[58] Field of Search ............... 426/532, 335, 656, 658, 426/335

[56] References Cited

U.S. PATENT DOCUMENTS

| | | | |
|---|---|---|---|
| 4,112,123 | 9/1973 | Roberts | 426/72 |
| 4,199,608 | 4/1980 | Gilmore et al. | 426/570 |
| 4,452,823 | 6/1984 | Connolly et al. | 426/115 |
| 4,542,035 | 9/1985 | Huang et al. | 426/565 |
| 4,631,196 | 12/1986 | Zeller | 426/580 |
| 4,830,868 | 5/1989 | Wade et al. | 426/565 |
| 4,931,300 | 6/1990 | Monte | 426/335 |

*Primary Examiner*—Joseph Golian
*Attorney, Agent, or Firm*—Tod R. Nissle

[57] ABSTRACT

A nutritionally balanced water soluble powdered food composition which, when mixed with water, has a low pH, extended shelf life, high antimicrobial activity, and which includes protein alpha-amino acids in solution or in suspension. The food composition utilizes a binary stabilizer system.

6 Claims, No Drawings

LOW PH ANTIMICROBIAL FOOD COMPOSITION

This invention relates to nutritionally balanced food compositions for ingestion along the digestive tract of a patient.

More particularly, the invention relates to nutritionally balanced liquid food compositions which have a low pH, extended shelf life, high antimicrobial activity, and which include protein in solution or in suspension.

In a further respect, the invention relates to a liquid food composition including a low pH protein stabilizer system which, when the food composition is heated to a high temperature to be sterilized, maintains its homogeneity.

In another respect, the invention relates to a liquid food composition which includes a low pH protein stabilizer system and exhibits unusually low aerobic and anaerobic bacterial activity for long periods of time at room temperature.

Liquid nutritionally balanced food compositions are known in the art. See, for example, my U.S. Pat. No. 4,931,300 for "ANTIMICROBIAL FOOD COMPOSITION".

Liquid nutritionally balanced powdered food compositions like those described in my U.S. Pat. No. 4,931,300 have several potential disadvantages. Protein tends to precipitate from liquid solutions which, like the food composition in U.S. Pat. No. 4,931,300, have acidic pH values in the range of 2.0 to 5.5. In particular, protein tends to precipitate from such liquid solutions when the solutions are heated to a high temperature to sterilize the solutions. Solutions with low pH values in the range of 2.0 to 5.5 are, however, often preferred because the acidity of the solutions normally provides a high level of antimicrobial activity. Food compositions like the compositions disclosed in U.S. Pat. No. 4,931,300 are an exception and do not provide a high degree of antimicrobial activity. This is evidenced by the fact that the food composition in my U.S. Pat. No. 4,931,300 must be refrigerated after it is reconstituted and must then be utilized within about seventy-two hours. Even though the seventy-two hour shelf life of the reconstituted food composition is relatively short, it is still substantially longer than the shelf life of other comparable food compositions. See, for example, U.S. Pat. No. 4,112,123 to Roberts, where the shelf life of a comparable reconstituted refrigerated food composition is only about twenty-four hours. Another problem associated with acidic aqueous food compositions of the type described in U.S. Pat. Nos. 4,112,123 and 4,931,300 is that identifying an appropriate stabilizer for the food composition is difficult. The stabilizer must be able to act quickly when the food composition is reconstituted as a drink, must not produce a composition which has excessive viscosity, must have an extended shelf life, and must be able to resist degradation due to the acidic nature of the food composition.

Accordingly, it would be highly desirable to provide a liquid food composition which would produce a low viscosity solution which has a pH in the range of about 2.0 to 6.5, has a high antimicrobial activity, has an extended shelf life at room temperature, and which prevents protein from precipitating or settling from solution when the solution is sterilized at high temperature.

Therefore, it is a principal object of the invention to provide an improved food composition.

Another object of the invention is to provide a low pH liquid food composition which includes alpha-amino acids or other protein and which generally prevents protein from precipitating or separating from the liquid food composition.

A further object of the invention is to provide a nutritionally balanced liquid food composition which includes a low pH protein stabilizer system which has a high antimicrobial activity and has an extended shelf life at room temperature.

These and other, further and more specific objects and advantages of the invention will be apparent to those skilled in the art from the following detailed description thereof.

Briefly, I have discovered a food powder composition which has a high antimicrobial activity and extended shelf life. The food composition includes from 6% to 28% by weight of a water soluble protein; from 4 to 22% by weight of triglycerides of predominantly 6 to 26 carbon atoms in the fatty acid chain; from 35% to 78% by weight of carbohydrates selected from the group consisting of corn syrup solids, trisaccharides, tetrasaccharides, pentasaccharides, hexasaccharides, dextrose, fructose, sucrose, maltose, oligosaccharides and high saccharides; from 0.01% to 10.0% by weight of an emulsifier; from 0.1% to 8% by weight of an edible acid; from 0.01% to 6% by weight of an antimicrobial agent selected from the group consisting of sorbic acid, benzoic acid, sodium benzoate, potassium sorbate, sodium sorbate, and potassium benzoate; and, from 0.1% to 20.0%, preferably 0.2% to 5.0% by weight of pectin. The food composition provides up to about three calories per cubic centimeter of composition. On being reconstituted with water, the composition forms a liquid solution which has an osmolarity of 250 to 650. The pH of the reconstituted food composition is from 2.0 to 6.5, preferably 3.0 to about 5.7. The water soluble protein is preferably whey protein or any other acid stable protein or peptide.

For purposes of the present specification, the term protein alpha-amino acids is defined to include monopeptides, dipeptides, tripeptides, and oligopeptides prepared by the partial hydrolysis of proteins or by synthesis and to include whey protein.

Peptide alpha-amino acids help in reducing the pH of the food composition, and consequently, in reducing the quantity of acidulant required in preparing the food composition. A peptide is any of a class of amides that are derived from two or more amino acids by combination of the amino group of one acid with carboxyl group of another, that yield these acids on hydrolysis, that are classified according to the number of component amino acids, and that are obtained by partial hydrolysis of proteins or by synthesis (as from alpha-amino acids or their derivatives). A dipeptide is a peptide that yields two molecules of amino acid on hydrolysis. A polypeptide is a polyamide that yields amino acids on hydrolysis but has a lower molecular weight than a protein and that is obtained by partial hydrolysis of proteins or by synthesis. Peptides are easier to digest than whey and other proteins.

Peptides are prepared from hydrolyzing proteins of any kind, and are commonly prepared by hydrolyzing egg, milk, or soy.

For purposes of the present specification, the term "whey protein" is defined to mean that water soluble or suspendible, essentially undenatured protein fraction derived from cheese whey which protein fraction is, essentially, retained by an ultra-filtration membrane that permits lactose, lactic acid, and soluble salts to pass through the membrane. Whey protein is specific and identifiable in terms of its composition and is not necessarily dependant upon a process for production thereof. Whey protein may be obtained by methods other than ultrafiltration, e.g., gel filtration.

The amount of protein alpha-amino acids or other water soluble proteins used in the present powder food composition may vary widely, but for most applications from 4% to 22% on a dry weight basis is suitable, especially between about 15% and 20%.

The protein alpha-amino acids are essentially water soluble or suspendible, and capable of being compounded for formulated into stable and pourable form in order to function in the manner required. Further, it is the protein alpha-amino fraction containing one or more than twenty alpha-amino acids, most of which have the general formula RCH (NH$_2$) COOH, that are synthesized in plant and animal tissues, that are considered the building blocks of proteins, from which they can be obtained by hydrolysis, and that play an important role in metabolism, growth, maintenance and repair of tissue.

Table 1 in U.S. Pat. No. 4,112,123 to Roberts shows a typical amino acid profile for whey protein used in the present invention.

Medium-chain triglycerides (MCT's) utilized in the food composition of the invention produce a composition of low viscosity while concomitantly providing high caloric content and easily digestible compositions. The fatty acid chains of medium-chain triglycerides are predominantly between about 6 and 12 carbon atoms, and are preferably utilized in conjunction with long-chain triglycerides (LCT's) in which fatty acid chains are predominately between about 14 to 26 carbon atoms.

The proportion of LCT's and MCT's in the powder food composition can vary widely, but typically is about 4% to 22% by weight, with 12% to 18% being an optimal range.

Any food grade emulsifier is used for present emulsification purposes and combinations for emulsifiers are used if desired. Any of the long fatty acid glycerol emulsifiers can be used, which normally have a C-12 to C-20 esterified chain. Typical among these are glycerollactopalmitate or the stearate. Alternately, the propylene derived emulsifiers may be used, such as propylene glycol monsterate, or the oleate, palmitate, and myristate. Likewise, the "Span" series of emulsifiers may be used. These are well-known emulsifiers and are fatty acid partial esters of the sorbitol anhydrides (or sorbitan). One well known emulsifier is the "Tween" series of polyoxyethylene derivatives of fatty acid partial esters of sorbitol anhydride. Tween 80 and Atmos 300 are often used in combination. The well known Atmos series of mono and diglycerides may be used. Also, lecithin is a suitable emulsifier. The amount of the emulsifier is chosen to suit the particular powder food composition, and generally ranges from about 0.01% to 10% by weight.

The powder food composition contains from 35% to 78% by weight of carbohydrates. The carbohydrates may be any of the digestible carbohydrates such as dextrose, fructose, sucrose, maltose, oligosaccharides, high saccharides, or mixtures thereof, depending on usage.

Vitamins, minerals, and other trace elements can be used to supplement the food composition and for purposes of total nutritional balance. These supplements can be varied as desired by are typically equal to the RDA or greater based on 2,000 calories. Soy bran, rice bran, or other fiber polysaccharides or sources of fiber can be included in the food composition.

The powdered food composition includes 0.1% to 20%, preferably 0.2% to 5.0%, by weight of a pectic substance selected from the group of complex colloidal carbohydrate derivatives of plant origin containing a large proportion of units (in excess of 50% by weight of the pectic substance) derived from galacturonic acid and subdivided into protopectins, pectins, pectinic acids, and pectic acids. The presently preferred pectic substance is pectin.

Conventional coloring agents, such as the FDA colors, may be used, as well as conventional preservatives, such as BHT and BHA. BHT and BHA preserve fats.

The food composition is provided in a powdered form having a relatively low moisture content. The moisture content is, as is the case for many powdered formulations, preferably at least below 4% by weight and more preferably below 3% by weight. Such low moisture content provides a product having a shelf life of at least one year shelf stability at ambient conditions if hermetically sealed.

The powdered form of the food composition may be reconstituted with a liquid. The liquid form of the food composition of the invention need not be pasteurized or stored under refrigerated conditions. However, in one preferred form of the invention, the liquid form is sterilized at a temperature of a least 200 degrees Fahrenheit. During this sterilization process, a novel pH protein stabilizer system comprised of a pectic substance and methylcellulose prevents the precipitation of protein from the liquid at high temperatures. This stabilizer system is described in detail later herein.

The dried powder is reconstituted with any desired edible liquid. The powder is ordinarily partially dissolved and partially suspended in the resulting liquid form of the invention. While it is possible to reconstitute the composition with liquid such as alcohol, the reconstituting liquid will ordinarily be principally water. The water may contain additional ingredients such as alcohol, glycerol, propylene glycol, sugars and flavor.

The caloric content of the liquid solutions of the reconstituted food composition of the invention is adjusted to any desired level up to about 3 calories per cubic centimeter. One half to two calories per cubic centimeter is preferred.

The osmolarity of the reconstituted food composition is in the range of 250 to 650, but preferably is in the range of 275 to 350 mOSm per liter of 1 calorie per cubic centimeter food.

The powder food compositions also include 0.1% to 8% by weight edible acidulants such as malic acid, acetic acid, citric acid, lactic, acid, sodium acetate, fumaric acid, or an acidic salt such as sodium acetate in order to adjust the pH within the range of 2 to 6.5, preferably about 3 to 5.7. This pH is critical to the extended shelf life of the invention. Any pH in excess of about 6.5 is not preferred because such allows greater microbial activity and minimizes the antimicrobial effects of sorbates and benzoates utilized in the invention. A pH greater than 6.5 is totally unacceptable because of the greatly reduced antimicrobial activity of the sorbates and benzoates critical to the invention.

The antimicrobial activity of sorbic and benzoic acid is due primarily to the undissociated acid molecule. Antimicrobial activity is therefore pH dependent and the estimated activity at any pH can be estimated as shown below in Table 1.

TABLE 1

EFFECT OF pH ON DISSOCIATION

| pH | Percent Undissociated Acid | |
|---|---|---|
| | Sorbic | Benzoic |
| 3 | 98 | 94 |
| 4 | 86 | 60 |
| 5 | 37 | 13 |
| 6 | 6 | 1.5 |
| 7 | 0.6 | 0.15 |

The food composition includes 0.01% to 6% by weight of a sorbate or benzoate such as sorbic acid, benzoic acid, potassium sorbate, sodium sorbate, potassium benzoate, sodium benzoate, and the like. Such benzoates and sorbates are crucial because at low pH values in the range of 2 to 6.5 they provide significant antimicrobial activity, A novel low pH protein stabilizer system is utilized in the food composition of the invention. Various conventional protein stabilizer systems will not function properly at the high temperatures used to sterilize the reconstituted food composition and permit the protein to precipitate out of the reconstituted composition. I have discovered a novel low pH protein stabilizer system which effectively stabilizes the protein in the reconstituted food composition of the invention at high temperature. The low pH protein stabilizer food composition of the invention also appears to produce an interactive synergistic effect which causes the bacteria count in the reconstituted food composition to be low when the food composition is permitted to set exposed to the air at room temperature.

The low pH protein stabilizer system in the powder form of the invention includes, as described above, from 4% to 22% on a dry weight basis whey protein or other protein alpha-amino acid and from 0.1% to 20.0%, preferably 0.2% to 5.0%, by dry weight of pectin or another pectic substance. In addition, 0.001% to 10.0%, preferably 0.01% to 4.0%, by weight of sodium carboxymethylcellulose or another methylcellulose is preferably, but not necessarily, utilized with the pectic substance because the carboxymethylcellulose and pectic substance synergistically interact to effectively stabilize the aqueous food composition which results when the powder form is reconstituted with water. Utilizing whey protein in the food composition without pectin, with or without carboxymethylcellulose, is not acceptable because the food composition, when reconstituted, does not exhibit the ability to prevent the whey protein from precipitating out of the reconstituted solution at high sterilization temperatures. When, however, whey protein is utilized in combination with pectin and sodium carboxymethylcellulose a reconstituted food composition results which is unusually stable at high temperature and resistant to the growth of aerobic and anaerobic bacteria. Samples of the reconstituted food composition of the invention have been left exposed to the air for ten days and with the detection of fewer than 10 to 20 aerobic bacteria per millimeter of reconstituted food composition. The growth of so few bacteria is highly unusual. Further, when bacteria were "dumped" into the reconstituted food composition, the number of such bacteria gradually decreased over time until living bacteria no longer existed.

After the dried powder food composition of the invention is reconstituted it has an extended shelf life at room temperature of several days or more. The ratio of water to composition will vary with the proportion of the ingredients of the composition and with the desired consistency required, as discussed above. By way of example, on a weight/weight basis of composition to water, the dilutions on a 100 gram basis can be:

| Calories/ml. of solution | To make 100 grams solution gms powder*/gms water | Approximate viscosity (centipoises) |
|---|---|---|
| 0.5 | 18/82 | <100 |
| 1 | 25/75 | 100 |
| 1.5 | 32/68 | 250 |
| 2 | 40/50 | 500 |

*Powder of Example 1 below

The following examples depict the presently preferred embodiments of the invention for the purposes of illustrating the practice thereof and not by way of limitation of the scope of the invention. In the examples, all proportions are by weight, unless otherwise noted.

EXAMPLE 1

The food composition in powder form was prepared by blending a number of ingredients.

| Component | Pounds |
|---|---|
| SUGAR | 1592.000 |
| WHEY PROTEIN CONC., (FORETEIN 35) (1) | 660.700 |
| CALCIUM LACTATE, PENTAHYDRATE (4) | 76.100 |
| NON DAIRY CREAMER (CREATIVE CREAMER 829) (2) | 54.300 |
| MALTODEXTRIN, M100 (POLYSACCHARIDES) | 51.000 |
| CITRIC ACID | 43.500 |
| SODIUM CARBOXYMETHYLCELLULOSE (3) | 10.000 |
| PECTIN-CITRIC | 35.000 |
| EMULSIFIER (BEATREME 3581Z) (2) | 5.200 |
| SODIUM CITRATE | 4.300 |
| BETA CAROTENE, 1% DILUTION CWS | 4.300 |
| BIOTIN | 0.005 |
| CALCIUM PANTOTHENATE | 0.180 |
| FERRIC ORTHOPHOSPHATE, DIHYDRATE | 0.900 |
| FOLIC ACID | 0.007 |
| MANGANESE SULFATE, MONOHYDRATE | 0.100 |
| NIACINAMIDE | 0.316 |
| POTASSIUM SORBATE | 4.544 |
| SELENIUM YEAST CONCENTRATE | 0.900 |
| VITAMIN B-1 MONONITRATE | 0.025 |
| VITAMIN B-12 1% DILUTION | 0.010 |
| VITAMIN B-2 TYPE S | 0.028 |
| VITAMIN B-6 HCL | 0.040 |
| VITAMIN C | 3.190 |
| VITAMIN D3, 100 S.D. | 0.100 |
| VITAMIN E 50% S.D. | 0.990 |
| ZINC SULFATE, MONOHYDRATE | 0.700 |
| FLAVOR (Q.S.) | 13.000 |
| TOTAL | 2561.435 |

(1) Wisconsin Dairies, Foremost Ingredients Group, Box 111, Baraboo, Wisconsin 53913-0111; (608) 356-8316.
(2) Beatreme Foods, 352 East Grand Avenue, Beloit, Wisconsin 53511; (800) 328-7517.
(3) Aqualon Company, Little Falls Centre One, 2711 Centerville Road, Wilmington, Delaware 19850; (800) 345-8104.
(4) Gallard-Schlesinger Industries, 584 Mineola Avenue, Carle Place, New York 11514; (516) 333-5600.

The approximate percent calories from the various ingredients are carbohydrates 50.0%, fat 10.0%, and protein 40.0%. The carbohydrates included in the powder food composition include sucrose, dextrose, maltose, lactose, trisaccharides, tetrasaccharides, pentasaccharides, hexasaccharides, and higher saccharides. When 25 gm of the food powder composition is reconstituted with 75 gm of water the resulting mixture has a caloric density (Cal/ml) of about 1.0; and, a total Cal/Nitrogen ratio of about 160.

During the blending of the above-listed ingredients of the food composition, agglomeration techniques are preferably employed to make the resulting powder mixture more easily dispersed and soluble in water.

EXAMPLE 2

The 2561.435 pounds of the food composition powder of Example 1 is mixed with 6538.000 pounds of water. The resulting drink provides 1.1 calories per cubic centimeter, has a pH of about 4.7, has an osmolarity of 300, has a viscosity of about 90 to 100 centipoise, and has particles each having a size of less than about 100 mesh.

EXAMPLE 3

One thousand grams of a food composition in powder form is prepared by blending the following ingredients in the proportions noted.

| INGREDIENT | WEIGHT PERCENT Dry |
|---|---|
| SUGAR | 5.5 |
| WHEY PROTEIN CONCENTRATE | 13.35 |
| FORETEIN 35 (protein alpha-amino acids) | |
| CALCIUM LACTATE, PENTAHYDRATE | 3.67 |
| CREATIVE CREAMER 829 (fat emulsifier) | 5.5 |
| MALTODEXTRIN, M100 (agglomerated) | 58.03 |
| CITRIC ACID | 2.2 |
| EMULSIFIER, BEATREME 3581Z (fat emulsifier) | .22 |
| SODIUM CITRATE | .21 |
| VITAMIN PREMIX | .22 |
| (Vitamins A, D, C, K, etc.) | |
| MAGNESIUM OXIDE | .18 |
| POTASSIUM SORBATE | .46 |
| PECTIN | 10.00 |
| WATER | .46 |
| | 100.00 |

The approximate percent calories from the various ingredients are carbohydrates 50%, fat 10%, and protein 40%. The carbohydrates included in the powder food composition include sucrose, dextrose, maltose, lactose, trisaccharides, tetrasacchrides, pentasaccharides, hexasaccharides, and higher saccharides. When 25 gm of the food powder composition is reconstituted with 75 gm of water the resulting mixture has a caloric density (Cal/ml) of about 1.

EXAMPLE 4

Two hundred and thirty-seven grams of food composition powder of EXAMPLE 3 is mixed with 832 milliliters of sterile distilled water at 5:00 pm on May 11, 1992. The resulting drink provides about 1 calorie per cubic centimeter, has a pH of about 4.6, has an osmolarity of about 300, has a viscosity of about 90 to 100 centipoise, and has particulate each having a size of less than about 100 mesh.

EXAMPLE 5

One thousand grams of the powder of EXAMPLE 3 is prepared by mixing the ingredients in the proportions noted, except 0.23 grams of potassium sorbate is substituted for the 0.46 grams of potassium sorbate.

EXAMPLE 6

Two hundred and thirty seven grams of the food composition powder of EXAMPLE 5 is mixed with 832 milliliters of sterile distilled water at 5:00 pm on May 11, 1992. The resulting drink provides about 1 calorie per cubic centimeter, has a pH of about 4.6, has an osmolarity of about 300, has a viscosity of about 90 to 100 centipoises, and has particles of food composition each having a size of less than about 100 mesh.

EXAMPLE 7

As soon as the drink (suspension) of EXAMPLE 4 is produced, i.e., as soon as the rehydration of the powder is performed, a plate count is performed to determine the presence of aerobic and anaerobic bacteria. The plate count is performed by transferring one milliliter of the drink to a 10 milliliter enriched Thio. The Thio is incubated at 35° C. for four days to culture for anaerobes. The Thio is then examined to determine the existence of aerobic and anaerobic bacteria. The forgoing plate count procedure is carried out in accordance with the FDA Bacteriological Analytical Manual, 4th Edition, 1984, Chapter 4, and with the ASM Manual of Clinical Microbiology, 4th Edition, 1985.

The drink of EXAMPLE 4 is stored at room temperature exposed to the air. A plate count is initiated at 5:00 pm each day for ten consecutive days. As shown below in TABLE II, in each plate count less than ten aerobic organisms per grams are detected. No anaerobic bacteria are detected during any of the plate counts.

TABLE II

| PLATE COUNT RESULTS SHOWING ABSENCE OF AEROBIC BACTERIA IN SUSPENSION | | |
|---|---|---|
| PLATE COUNT FOR DAY NO. | DESCRIPTION | AEROBIC ORGANISMS PER MILLILITER |
| 1 | Rehydration, 5:00 pm | <10 |
| 2 | 1 day, 5:00 pm | <10 |
| 3 | 2 days, 5:00 pm | <10 |
| 4 | 3 days, 5:00 pm | <10 |
| 5 | 4 days, 5:00 pm | <10 |
| 6 | 5 days, 5:00 pm | <10 |
| 7 | 6 days, 5:00 pm | <10 |
| 8 | 7 days, 5:00 pm | <10 |
| 9 | 8 days, 5:00 pm | <10 |
| 10 | 9 days, 5:00 pm | <10 |
| 11 | 10 days, 5:00 pm | <10 |

EXAMPLE 8

As soon as the drink (suspension) of EXAMPLE 6 is produced, i.e., as soon as the rehydration of the powder is performed, a plate count is performed to determine the presence of aerobic and anaerobic bacteria. The plate count is performed by transferring one milliliter of the drink to a 10 milliliter enriched Thio. The Thio is incubated at 35° C. for four days to culture for anaerobes. The Thio is then examined to determine the existence of aerobic and anaerobic bacteria. The foregoing plate count procedure is carried out in accordance with the FDA Bacteriological Analytical Manual, 4th Edition, 1984, Chapter 4, and with the ASM Manual of Clinical Microbiology, 4th Edition, 1985.

The drink of EXAMPLE 6 is stored at room temperature. A plate count is initiated at 5:00 pm each day for ten consecutive days. As shown below in TABLE III, in each plate count twenty or less aerobic organisms per gram are detected.

TABLE III

PLATE COUNT RESULTS SHOWING ABSENCE OF AEROBIC BACTERIA IN SUSPENSION

| PLATE COUNT FOR DAY NO. | DESCRIPTION | AEROBIC ORGANISMS PER MILLILITER |
| --- | --- | --- |
| 1 | Rehydration, 5:00 pm | 20 |
| 2 | 1 day, 5:00 pm | <10 |
| 3 | 2 days, 5:00 pm | <10 |
| 4 | 3 days, 5:00 pm | <10 |
| 5 | 4 days, 5:00 pm | <10 |
| 6 | 5 days, 5:00 pm | <10 |
| 7 | 6 days, 5:00 pm | <10 |
| 8 | 7 days, 5:00 pm | <10 |
| 9 | 8 days, 5:00 pm | <10 |
| 10 | 9 days, 5:00 pm | <10 |
| 11 | 10 days, 5:00 pm | <10 |

EXAMPLE 9

Two hundred and thirty seven grams of the food composition powder of EXAMPLE 3 was mixed with 832 milliliters of sterile distilled water in a beaker to form a homogenous solution. The solution had a viscosity of about 50 centipoises, The size of food composition particles in suspension in the solution was less than 100 mesh. The solution was allowed to stand for ten days at room temperature. At the end of the ten day period, the solution was still substantially homogeneous and particulate had not settled or separated out of solution form layers of material at the bottom of the beaker.

EXAMPLE 10

Two hundred and thirty seven grams of the food composition powder of EXAMPLE 5 was mixed with 832 milliliters of sterile distilled water in a beaker to form a homogeneous solution. The solution has a viscosity of about 250 centipoises. The size of the food composition particles in suspension in the solution was less than or equal to 100 mesh. The solution was allowed to stand for ten days at room temperature. At the end of the ten day period, the solution was still substantially homogeneous and particulate had not settled or separated out of solution to form layers of material at the bottom of the beaker.

EXAMPLE 11

One thousand grams of the powder of EXAMPLE 3 is prepared by mixing the ingredients in the proportions noted, except that 8.0 grams of MALTODEXTRIN M100 and 2.0 grams of whey protein concentrate FORTEIN 35 are utilized in place of the ten grams of pectin.

EXAMPLE 12

Two hundred and thirty seven grams of the food composition powder of EXAMPLE 11 is mixed with 832 milliliters of sterile distilled water in a beaker to form a homogeneous solution. The solution has a viscosity of about 250 centipoises. The size of the food composition particles in suspension in the solution is less than or equal to 100 mesh. The solution is allowed to stand at room temperature. In less than six hours particulate begin settling and separating out of the solution to form a layer of material at the bottom of the beaker.

EXAMPLE 13

One thousand grams of the powder of EXAMPLE 3 is prepared by mixing the ingredients in the proportions noted, except that 8.0 grams of MALTODEXTRIN, M100 and 2.0 grams of whey protein concentrate FORETEIN 35 are utilized in place of the ten grams of pectin.

EXAMPLE 14

Two hundred and thirty seven grams of food composition powder of EXAMPLE 13 is mixed with 832 milliliters of sterile distilled water in a beaker to form a homogeneous solution. The solution has a viscosity of about 250 centipoises. The size of food composition particles in suspension in the solution is less than or equal to 100 mesh. The solution is heated to and remains at the temperature of 220 degrees Fahrenheit for five (5) minutes. After the solution had been heated for two minutes, precipitate begins to form and fall to the bottom of the beaker. The precipitate contains whey protein.

EXAMPLE 15

Two hundred and thirty seven grams of food composition powder of EXAMPLE 3 is mixed with 832 milliliters of sterile distilled water in a beaker to form a homogeneous solution. The solution has a viscosity of about 250 centipoises. The size of food composition particles in suspension in the solution is less than or equal to 100 mesh. The solution is heated to and remains at the temperature of 220 degrees Fahrenheit for five (5) minutes. Precipitate does not form during the time the solution is heated.

EXAMPLE 16

Two hundred and thirty seven grams of food composition powder of EXAMPLE 1 is mixed with 832 milliliters of sterile distilled water in a beaker to form a homogeneous solution. The solution has a viscosity of about 250 centipoises. The size of food composition particles in suspension in the solution is less than or equal to 100 mesh. The solution is heated to the temperature of 285 degrees Fahrenheit for ten (10)-seconds. Precipitate does not form during the time the solution is heated.

EXAMPLE 17

Two hundred and thirty seven grams of food composition powder of EXAMPLE 13 is mixed with 832 milliliters of sterile distilled water in a beaker to form a homogeneous solution. The solution has a viscosity of about 250 centipoises. The size of food composition particles in suspension in the solution is less than or equal to 100 mesh. The solution is heated to and remains at the temperature of 300 degrees Fahrenheit for four (4) seconds. After the solution had been heated for one (1) minutes, precipitate begins to form and fall to the bottom of the beaker. The precipitate contains whey protein.

EXAMPLE 18

One thousand grams of the powder of EXAMPLE 1 is prepared by mixing the ingredients in the proportions noted, except that 1.0 gram of Maltodextrin (Polysaccharides) is utilized in place of the one gram of pectin.

EXAMPLE 19

Two hundred and thirty seven grams of food composition powder of EXAMPLE 18 is mixed with 832 milliliters of sterile distilled water in a beaker to form a homogeneous solution. The solution has a viscosity of about 250 centipoises. The size of food composition particles in suspension in the solution is less than or equal to 100 mesh. The solution is heated to and remains at the temperature of 300 degrees Fahrenheit for four (4) seconds. After the solution had been heated for one (1) minute, precipitate begins to form and fall to the bottom of the beaker. The precipitate contains whey protein.

EXAMPLE 20

Two hundred and thirty seven grams of food composition powder of EXAMPLE 18 is mixed with 832 milliliters of sterile distilled water in a beaker to form a homogeneous solution. The solution has a viscosity of about 250 centipoises. The size of food composition particles in suspension in the solution is less than or equal to 100 mesh. The solution is heated to and remains at the temperature of 285 degrees Fahrenheit for ten (10) seconds. After the solution has been heated for two (2) minutes, precipitate begins to form and fall to the bottom of the beaker. The precipitate contains whey protein.

EXAMPLE 21

Two hundred and thirty seven grams of food composition powder of EXAMPLE 1 is mixed with 832 milliliters of sterile distilled water in a beaker to form a homogeneous solution. The solution has a viscosity of about 250 centipoises. The size of food composition particles in suspension in the solution is less than or equal to 100 mesh. The solution is heated to and remains at the temperature of 300 degrees Fahrenheit for four (4) seconds. Precipitate does not form during the time the solution is heated.

EXAMPLE 22

One thousand grams of the powder of EXAMPLE 3 is prepared by mixing the ingredients in the proportions noted, except that ten grams of protopectin is utilized in place of the ten grams of pectin.

EXAMPLE 23

Two hundred and thirty seven grams of food composition powder of EXAMPLE 22 is mixed with 832 milliliters of sterile distilled water in a beaker to form a homogeneous solution. The solution has a viscosity of about 250 centipoises. The size of food composition particles in suspension in the solution is less than or equal to 100 mesh. The solution is heated to and remains at the temperature of 285 degrees Fahrenheit for ten (10) seconds. Precipitate does not form during the time the solution is heated.

EXAMPLE 24

One thousand grams of the powder of EXAMPLE 3 is prepared by mixing the ingredients in the proportions noted, except that ten grams of pectinic acid is utilized in place of the ten grams of pectin.

EXAMPLE 25

Two hundred and thirty seven grams of food composition powder of EXAMPLE 24 is mixed with 832 milliliters of sterile distilled water in a beaker to form a homogeneous solution. The solution has a viscosity of about 250 centipoises. The size of food composition particles in suspension in the solution is less than or equal to 100 mesh. The solution is heated to the temperature of 300 degrees Fahrenheit for three (3) seconds. Precipitate does not form during the time the solution is heated.

EXAMPLE 26

Examples 24 and 25 are repeated in sequence, except that in Example 24 the amount of pectinic acid in the powder is reduced to a weight percent sufficient to permit some precipitate containing whey protein to form during Example 25.

EXAMPLE 27

Example 26 is repeated, except the powder of Example 24 includes 0.40% by weight sodium carboxymethylcellulose. No precipitate is formed during Example 25.

EXAMPLE 28

Example 27 is repeated, except in Example 24 ten grams of pectin is substituted for ten grams of pectinic acid. Similar results are obtained.

The viscosity of the food composition of the invention is important and is, in part, responsible for the difficulty in finding a suitable stabilizer. The viscosity is such that the food composition, when reconstituted with water, can be readily drunk. The viscosity at 68° F. of the reconstituted food composition is less than 10,000 centipoises, preferably less than 1000 centipoises. The viscosity of olive oil at 68° F. is 1008 millipoises; of sperm oil at 68° F. is 420 millipoises; of water at 68° F. is 10.02 millipoises; of caster oil at 68° F. is 10,272 millipoises; of turpentine at 68° F. is 14.87 millipoises; of methyl alcohol at 68° F. is 5.93 millipoises; and, of glycerol at 20° C. is 10,690 millipoises. The viscosity of glycerol at 20.9° C. is 7,776 millipoises. Even at low viscosities of 500 centipoises or less, the food composition of the invention retains its homogeneity. In one embodiment of the invention, the preferred viscosity is less than 500 centipoises.

The size of the particles in the food composition of the invention after the food composition is reconstituted is also important. Particles in the reconstituted food composition generally are each equal to or less than 100 mesh in size. A 20 mesh particle moves through a screen opening of 0.0331 inch; a 50 mesh particle moves through a screen opening of 0.0117 inch; a 100 mesh particle moves through a screen opening of 0.0059 inch; a 200 mesh particle moves through a screen opening of 0.0021 inch; and, a 325 mesh particle moves through a screen opening of 0.0017 inch. Since particulate in the reconstituted food composition must remain in suspension, the particulate size is small.

The food composition of the invention is ingested at any desired point along the digestive tract, but ordinarily is administered to a patient orally or is tubally fed directly into the patient's stomach. If appropriate, the reconstituted food composition can be tubally directly fed into the intestinal tract or the esophagus. The patient can, as would be appreciated by those of skill in the art, can be a hominid or other appropriate animal.

Having described my invention in such terms as to enable those skilled in the art to understand and practice it, and having identified the presently preferred embodiments thereof, I claim:

1. A method for preparing a sterile food composition for ingestion along the digestive tract of a patient, said method including the steps of
   (a) preparing a powder food composition by blending together (i) from 6% to 28% by weight of water soluble protein;

(ii) from 4% to 22% by weight of triglycerides of predominantly 6 to 26 carbon atoms in the fatty acid chain;

(iii) from 35% to 78% by weight of carbohydrates selected from the group consisting of corn syrup solids, trisaccharides, tetrasaccharides, pentasaccharides, hexasaccharides, dextrose, fructose, sucrose, maltose, oligosaccharides and high saccharides;

(iv) from 0.1% to 10% by weight of an emulsifier;

(v) from 0.1% to 8% by weight of an edible acid for adjusting the pH of the food composition within the range of 2 to 6;

(vi) from 0.01% to 6% by weight of an antimicrobial agent selected from the group consisting of sorbic acid, benzoic acid, sodium benzoate, potassium sorbate, sodium sorbate, and potassium benzoate; and, (v) from 1% to 5.0% by weight of a pectic substance;

(b) mixing said powder food composition with water to form an aqueous food solution;

(c) heating said aqueous food solution to a sterilization temperature of at least about two hundred degrees Fahrenheit for a time sufficient to kill all microorganisms in said food solution; and, (d) cooling said sterilized food solution.

2. The method of claim 1 wherein in step (a), from 0.001% to 4.0% by weight methylcellulose is blended into said powder food composition.

3. The method of claim 1 wherein in step (a), from 0.001% to 4.0% by weight sodium carboxymethylcellulose is blended into said powder food composition.

4. The method of claim 2 wherein in step (a) said pectic substance is pectin.

5. The method of claim 3 wherein in step (a) said pectic substance is pectin.

6. The method of claim 5 wherein in step (a) said pectic substance is pectin.

* * * * *